United States Patent
Bruls

(10) Patent No.: US 12,143,635 B2
(45) Date of Patent: Nov. 12, 2024

(54) PACKING OF VIEWS FOR IMAGE OR VIDEO CODING

(71) Applicant: KONINKLIJKE PHILIPS N.V., Eindhoven (NL)

(72) Inventor: Wilhelmus Hendrikus Alfonsus Bruls, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 102 days.

(21) Appl. No.: 18/018,064

(22) PCT Filed: Jul. 26, 2021

(86) PCT No.: PCT/EP2021/070767
§ 371 (c)(1),
(2) Date: Jan. 26, 2023

(87) PCT Pub. No.: WO2022/023227
PCT Pub. Date: Feb. 3, 2022

(65) Prior Publication Data
US 2023/0262262 A1  Aug. 17, 2023

(30) Foreign Application Priority Data

Jul. 31, 2020  (EP) .................................... 20188843

(51) Int. Cl.
H04N 19/597 (2014.01)
H04N 19/176 (2014.01)
H04N 19/182 (2014.01)

(52) U.S. Cl.
CPC ......... *H04N 19/597* (2014.11); *H04N 19/176* (2014.11); *H04N 19/182* (2014.11)

(58) Field of Classification Search
CPC ... H04N 19/597; H04N 19/176; H04N 19/182
(Continued)

(56) References Cited

U.S. PATENT DOCUMENTS 9,986,258 B2    5/2018 Bruls et al.
2018/0268570 A1 9/2018 Budagavi et al.
(Continued)

FOREIGN PATENT DOCUMENTS

EP    3422724 A1    1/2019
EP    3672251 A     6/2020

OTHER PUBLICATIONS

Yang et al "A Low Complexity Region Based Video Coder Using Backward Morphological Motion Field Segmentation" IEEE Transactions on Image Processing, vol. 8, No. 3 Mar. 1, 1999.
(Continued)

*Primary Examiner* — Amir Shahnami

(57) ABSTRACT

An encoder, decoder, encoding method and decoding method for 3DoF+ video are disclosed. The encoding method comprises receiving (110) multi-view image or video data comprising a basic view and at least a first additional view of a scene. The method proceeds by identifying (220) pixels in the first additional view that need to be encoded because they contain scene-content that is not visible in the basic view. The first additional view is divided (230) into a plurality of first blocks of pixels. First blocks containing at least one of the identified pixels are retained (240); and first blocks that contain none of the identified pixels are discarded. The retained blocks are rearranged (250) so that they are contiguous in at least one dimension. A packed additional view is generated (260) from the rearranged first retained blocks and encoded (264).

18 Claims, 10 Drawing Sheets

(58) Field of Classification Search
USPC .......................................................... 348/43
See application file for complete search history.

(56) References Cited

U.S. PATENT DOCUMENTS

| | | | | |
|---|---|---|---|---|
| 2021/0329214 | A1* | 10/2021 | Oh | ........................ H04N 13/178 |
| 2022/0165015 | A1 | 5/2022 | Bruls et al. | |
| 2022/0167013 | A1 | 5/2022 | Kroon et al. | |

OTHER PUBLICATIONS

International Search Report and Written Opinion From PCT/EP2021/070767 Mailed Oct. 4, 2021.
Richardson "The H.264 Advanced Video Compression Standard Extensions and Directions" (Chapter 10) Published 2010.
Ekmekcioglu "Multi View Video Coding via Virtual View Generation" (2007).
Jeong et al "Towards 3DoF and 360 Video Streaming System for Immersive Media" IEEE Access pp (99) 1-1.
"Rendering Omni-directional Stereo Content", Google Inc https://developers.google.com/vr/jump/rendering-ods-content.pdf (downloaded Jan. 6, 2023).
https://en.wikipedia.org/wiki/Distance_from_a_point_to_a_line (downloaded Jan. 6, 2023).
Blender project of: Christophe Seux, "Class room", https://www.blender.org/download/demo-files/ downloaded Jan. 6, 2023.
MPEG Oct. 2017 doc M41922, "FDIS 23090-2 Omnidirectional Media Format".
Unstructured Lumigraph Rendering, Chris Buehler etal, http://cs.harvard.edu/~sjg/papers/ulr.pdf (downloaded Jan. 6, 2023).
Proposed Draft 1.0 of TR: Technical Report on Architectures for Immersive Media, ISO/IEC JTC1/SC29/WG11/N17685, San Diego, USA, Apr. 2018.
MPEG document m44588 "RVS_based_3DoFPlus_evidence_results" Oct. 2018.

* cited by examiner

PACKING OF VIEWS FOR IMAGE OR VIDEO CODING

CROSS-REFERENCE TO PRIOR APPLICATIONS

This application is the U.S. National Phase application under 35 U.S.C. § 371 of International Application No. PCT/EP2021/070767, filed on Jul. 26, 2021, which claims the benefit of EP Patent Application No. EP 20188843.5, filed on Jul. 31, 2020. These applications are hereby incorporated by reference herein.

FIELD OF THE INVENTION

The present invention relates to coding of multi-view image- or video-data. It relates particularly to methods and apparatuses for encoding and decoding video sequences for virtual reality (VR) or immersive video applications.

BACKGROUND OF THE INVENTION

Coding schemes for several different types of immersive media content have been investigated in the art. One type is 360° video, also known as three-degree-of-freedom (3DoF) video. This allows views of a scene to be reconstructed for viewpoints with arbitrary orientation (chosen by the consumer of the content), but only at a fixed point in space. In 3DoF, the degrees of freedom are angular—namely, pitch, roll, and yaw. 3DoF video supports head rotations—in other words, a user consuming the video content can look in any direction in the scene, but cannot move to a different place in the scene.

As the name suggests, "3DoF+" represents an enhancement of 3DoF video. The "+" reflects the fact that it additionally supports limited translational changes of the viewpoint in the scene. This can allow a seated user to shift their head up, down, left, and right, forwards and backwards, by a small distance, for example. This enhances the experience, because it allows the user to experience parallax effects and, to some extent, to look "around" objects in the scene.

Unconstrained translations are the objective of six-degree-of-freedom (6DoF) video. This allows a fully immersive experience, whereby the viewer can move freely around the virtual scene, and can look in any direction, from any point in the scene. 3DoF+ does not support these large translations.

3DoF+ is an important enabling technology for virtual reality (VR) applications, in which there is growing interest. Usually, VR 3DoF+ content is recorded by using multiple cameras to capture the scene, looking in a range of different directions from a range of (slightly) different viewing positions. Each camera generates a respective "view" of the scene, comprising image data (sometimes also referred to as "texture" data) and depth data. For each pixel, the depth data represents the depth at which the corresponding image pixel data is observed.

Because the views all represent the same scene, from slightly different positions and angles, there is typically a high degree of redundancy in the content of the different views. In other words, much of the visual information captured by each camera is also captured by one or more other cameras. To store and/or transmit the content in a bandwidth-efficient manner, and to encode and decode it in a computationally efficient manner, it is desirable to reduce this redundancy. Minimising the complexity of the decoder is particularly desirable, since content may be produced (and encoded) once but maybe consumed (and therefore decoded) multiple times, by multiple users.

Among the views, one view may be designated the "basic" view or "central" view. The others may be designated "additional" views or "side" views.

SUMMARY OF THE INVENTION

It would be desirable to encode and decode basic and additional views efficiently—in terms of computational effort, energy consumption, and data rate (bandwidth). It is desirable to increase the coding efficiency in terms of both the bitrate and the number of pixels that need to be processed (pixel rate). The bitrate influences the bandwidth required to store and/or transmit the encoded views and the complexity of the decoder. The pixel rate influences the complexity of the decoder.

The invention is defined by the claims.

According to examples in accordance with an aspect of the invention, there is provided a method of encoding multi-view image or video data, according to claim 1.

Here, "contiguous in at least one dimension" means that either (i) there are no gaps between the retained first blocks, scanning from left to right or right to left along every row of blocks, or (ii) there are no gaps between the retained first blocks, scanning from top to bottom or bottom to top along all columns of blocks, or (iii) that the retained first blocks are contiguous in two dimensions. Case (i) means that the blocks are connected along rows: except for the blocks at the left and right ends of each row, every retained first block is adjacent to another retained first block to its left and right. However, there may be one or more rows with no retained blocks. Case (ii) means that the blocks are connected along columns: except for the blocks at the top and bottom of each column, every retained first block is adjacent to another retained first block above and below. However, there may be one or more columns with no retained blocks.

In case (iii), "contiguous in two dimensions" means that every retained first block is adjacent to at least one other such block (above, below, to the left, or to the right). There are therefore no isolated blocks or groups of blocks. Preferably, there are no gaps along any of the columns, and there are no gaps along any of the rows, as described above for the two one-dimensional cases.

Rearranging the retained first blocks may comprises shifting each retained first block in one dimension, in particular to position it directly adjacent to its nearest neighbouring retained first block along that dimension.

The shifting may comprise shifting horizontally, along rows of blocks, or shifting vertically along columns of blocks. Shifting horizontally may be preferred. In some examples, blocks may be shifted both horizontally and vertically. For example, blocks may be shifted horizontally, to produce contiguous rows of blocks. Then contiguous rows may be shifted vertically, so that the blocks are contiguous in two dimensions.

The shifting may comprise shifting the retained first blocks in the same direction. For example, shifting blocks to the left.

In the packed additional view, the retained first blocks may be contiguous with one edge of the view. This may be the left edge of the packed additional view.

The blocks may all have the same size.

The method may further comprise, before encoding the packed additional view: splitting the packed additional view into a first part and a second part; transforming the second part relative to the first part, to generate a transformed packed view; and encoding the transformed packed view into the video bitstream. That is, the transformed packed view is encoded instead of the original packed additional view. The transforming may be selected such that the transformed packed view has a reduced size in at least one dimension. In particular, the transformed packed view may have a reduced horizontal size (that is, a reduced number of columns of pixels).

The transforming optionally comprises one or more of: reversing the second part in a horizontal direction; inverting the second part in a vertical direction; transposing the second part; circularly shifting the second part along the horizontal direction and circularly shifting the second part along the vertical direction.

Reversing produces a mirror image of the rows (left-right). Inverting means flipping the columns upside down. Transposing means swapping the rows for columns (and vice versa), so that the first row is replaced with the original first column, the second row is replaced with the original second column, etc.

The retained blocks in a least one of the first part and the second part may be rearranged by shifting them to the left. This left-shift may be done before and/or after the transforming of the second part relative to the first part. This approach may work well when subsequently compressing the transformed packed additional view. Because of the way many compression standards work, this approach can help to reduce the bitrate after compression.

The method may further comprise encoding into the metadata bitstream a description of how the second part was transformed relative to the first part.

The method may further comprise encoding into the metadata bitstream a description of the order in which the additional views were packed into the packed additional view.

The metadata bitstream may be encoded using lossless compression, optionally with an error detecting and/or correcting code.

The packed additional view may have the same size as each additional view, along at least one dimension. In particular, they may have the same size along the vertical dimension (that is, the same number of rows of pixels).

The method may further comprise compressing the basic view and the packed additional view using a video compression algorithm, optionally a standardized video compression algorithm, which may employ lossy compression. Examples include but are not limited to High Efficiency Video Coding (HEVC), also known as H.265 and MPEG-H Part 2. The bitstream may comprise the compressed basic view and compressed packed additional view.

A compression block size of the video compression algorithm may be larger, in at least one dimension, than the size of the first and second blocks in that dimension. This can allow multiple smaller blocks (or slices of blocks) to be gathered together into a single compression block for the video compression. This can help to improve the coding efficiency of the retained blocks.

Each view may comprise image (texture) values and depth values.

Also provided is a method of decoding multi-view image or video data, according to claim 10.

Arranging the first blocks may comprise shifting them in one dimension, according to the description in the first packing metadata. In particular, the first blocks may be shifted to spaced apart positions along said dimension. In some examples, the arranging may comprise shifting the first blocks in two dimensions.

The views in the video bitstream may have been compressed using a video compression algorithm, optionally a standardized video compression algorithm. The method may comprise, when decoding the views, decompressing the views according to the video compression algorithm.

The method may comprise inverse transforming a second part of the packed additional view relative to a first part. The inverse transforming may be based on a description, decoded from the metadata bitstream, of how the second part was transformed relative to the first part during encoding.

Also provided is a computer program according to claim 12, which may be provided on a computer readable medium, preferably a non-transitory computer readable medium.

Also provided are an encoder according to claim 13; a decoder according to claim 14; and a bitstream according to claim 15.

The bitstream may be encoded and decoded using methods as summarized above. It may be embodied on a computer-readable medium or as a signal modulated onto an electromagnetic carrier wave. The computer-readable medium may be a non-transitory computer-readable medium.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
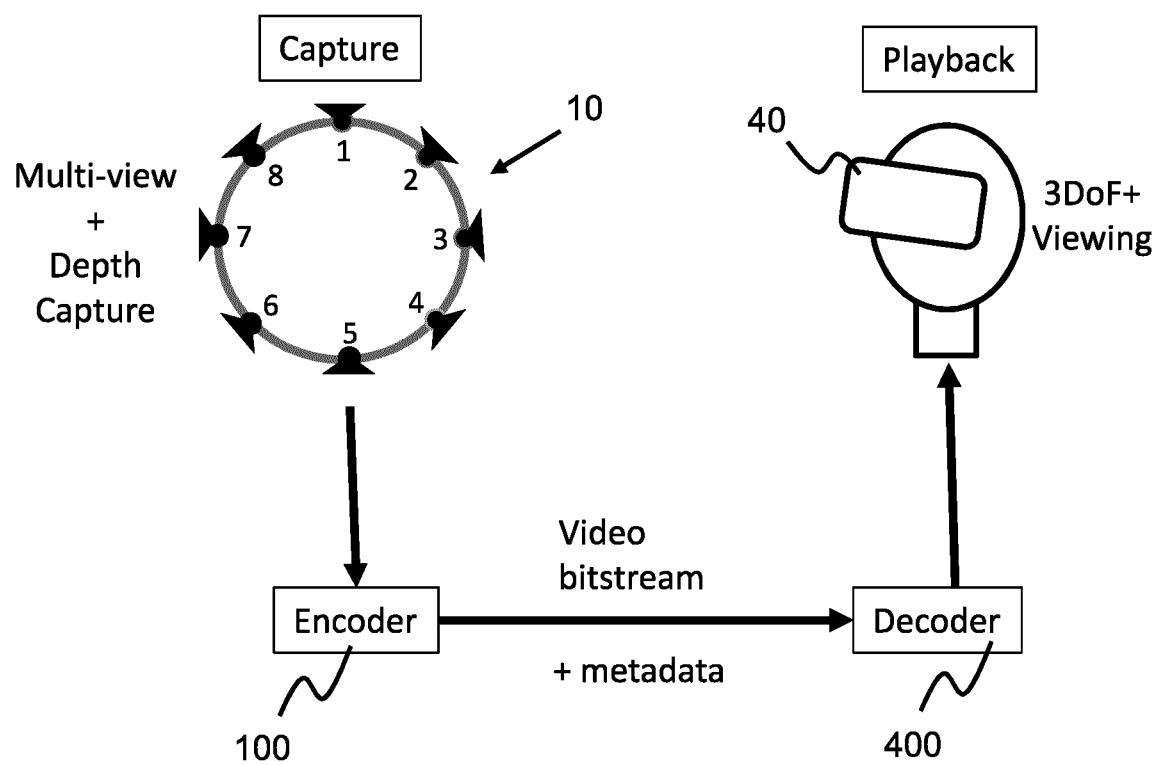
FIG. 1 illustrates a video encoding and decoding system operating according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

As used herein, a "view" refers to an image of a scene. (This image may be a still image or a frame of a video.) The image comprises a two-dimensional array of pixels, made up of rows and columns. Rows extend horizontally and columns extend vertically in this array. The directions "left" and "right" refer to the horizontal (that is, row) dimension. The directions "up"/"upwards" and "down"/"downwards" refer to the vertical (that is, column) dimension. The leftmost pixel is the first pixel on each row. The uppermost pixel is the first pixel in each column. When an image is divided into blocks of pixels all having the same height (in terms of a number of pixels), this results in rows of blocks. When an image is divided into blocks of pixels all having the same width (again, measured as a number pixels), this results in columns of blocks. When an image is divided into blocks having identical height and width, this results in a regular array of blocks, made up of rows and columns of blocks.

Whereas a basic (or "central") view may be encoded in its entirety, it is possible to "prune" additional views to the extent that they contain redundant visual content—that is, visual content already represented sufficiently accurately by the basic view. This leads to pruned additional views that are relatively sparse in visual content. The inventors have recognised that it can be advantageous to divide these additional views into blocks, and to rearrange these blocks to pack them together more efficiently, prior to compressing the additional views.

FIG. 1 illustrates an overall system according to an embodiment. FIG. 1 illustrates in simplified form a system for encoding and decoding 3DoF+ video. An array of cameras 10 is used to capture a plurality of views of a scene. Each camera captures conventional images (referred to herein as texture maps) and a depth map of the view in front of it. The set of views, comprising texture and depth data, is provided to an encoder 100. The encoder encodes both the texture data and the depth data, into a conventional video bitstream—for example, a high efficiency video coding (HEVC) bitstream. This is accompanied by a metadata bitstream, to inform a decoder 400 of the meaning of the different parts of the video bitstream. For example, the metadata tells the decoder which parts of the video bitstream corresponds to texture maps and which corresponds to depth maps. Depending on the complexity and flexibility of the coding scheme, more or less metadata may be required. For example, a very simple scheme may dictate the structure of the bitstream very tightly, such that little or no metadata is required to unpack it at the decoder end. With a greater number of optional possibilities for the bitstream, greater amounts of metadata will be required.

The decoder 400 decodes the encoded views (texture and depth) and renders at least one view of the scene. It passes the rendered view to a display device, such as a virtual reality headset 40. The headset 40 requests the decoder 400 render a particular view of the 3-D scene, using the decoded views, according to the current position and orientation of the headset 40.

An advantage of the system shown in FIG. 1 is that it is able to use conventional, 2-D video codecs to encode and to decode the texture and depth data. However, a disadvantage is that there is a large amount of data to encode, transport, and decode. It would thus be desirable to reduce the bitrate and or pixel rate, while compromising as little as possible on the quality of the reconstructed views.

Figure 2:
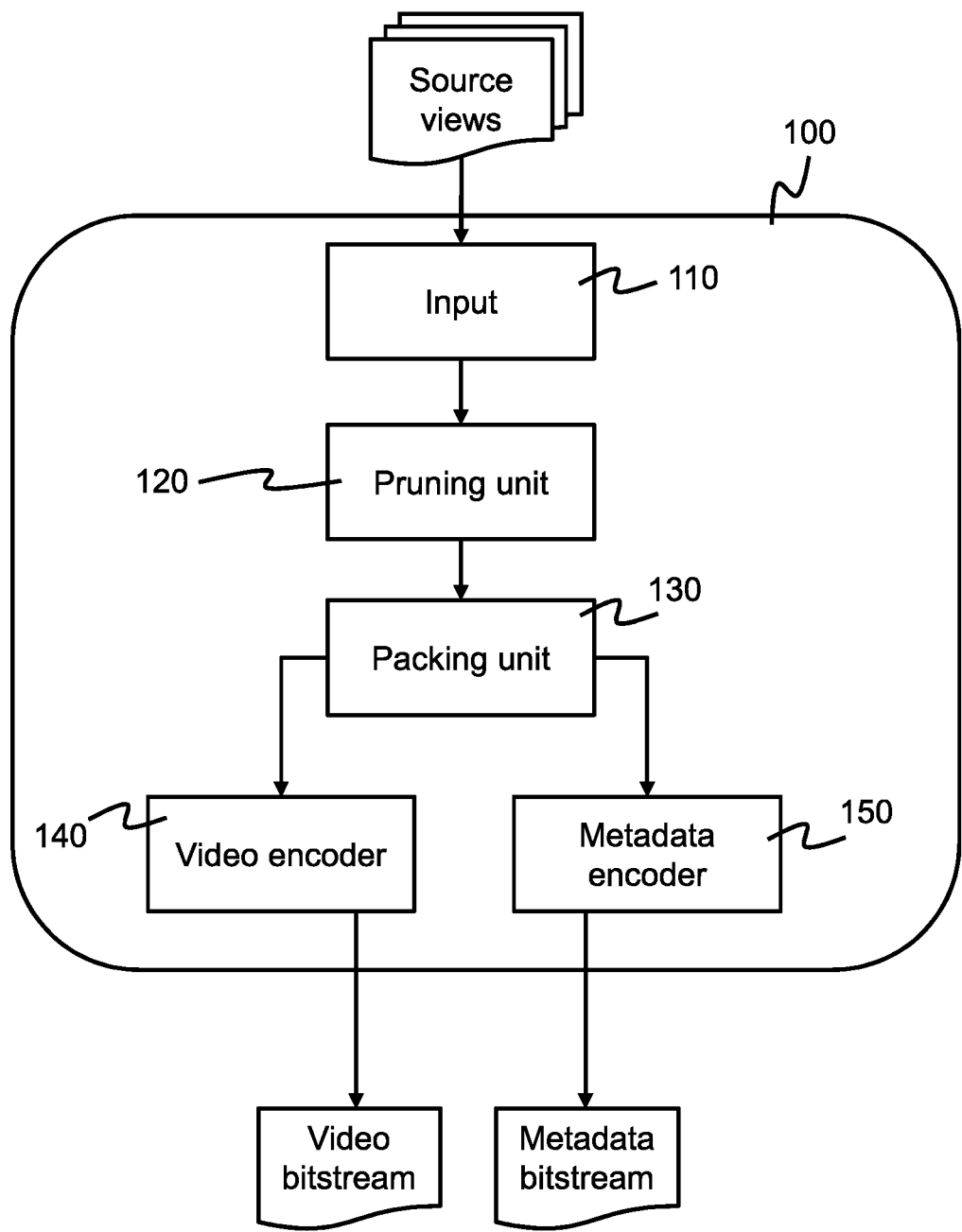
FIG. 2 is a block diagram of an encoder according to an embodiment.

FIG. 2 is a block diagram of the encoder 100 according to the present embodiment. The encoder 100 comprises an input 110 configured to receive the video data; a pruning unit 120; a packing unit 130; a video encoder 140 and a metadata encoder 150. An output of the pruning unit 120 is connected to an input of the packing unit 130. Outputs of the packing unit 130 are connected to the input of the video encoder 140 and the meta data encoder 150, respectively. The video encoder 140 outputs a video bitstream; the metadata encoder 150 outputs a metadata bitstream.

Figure 3:
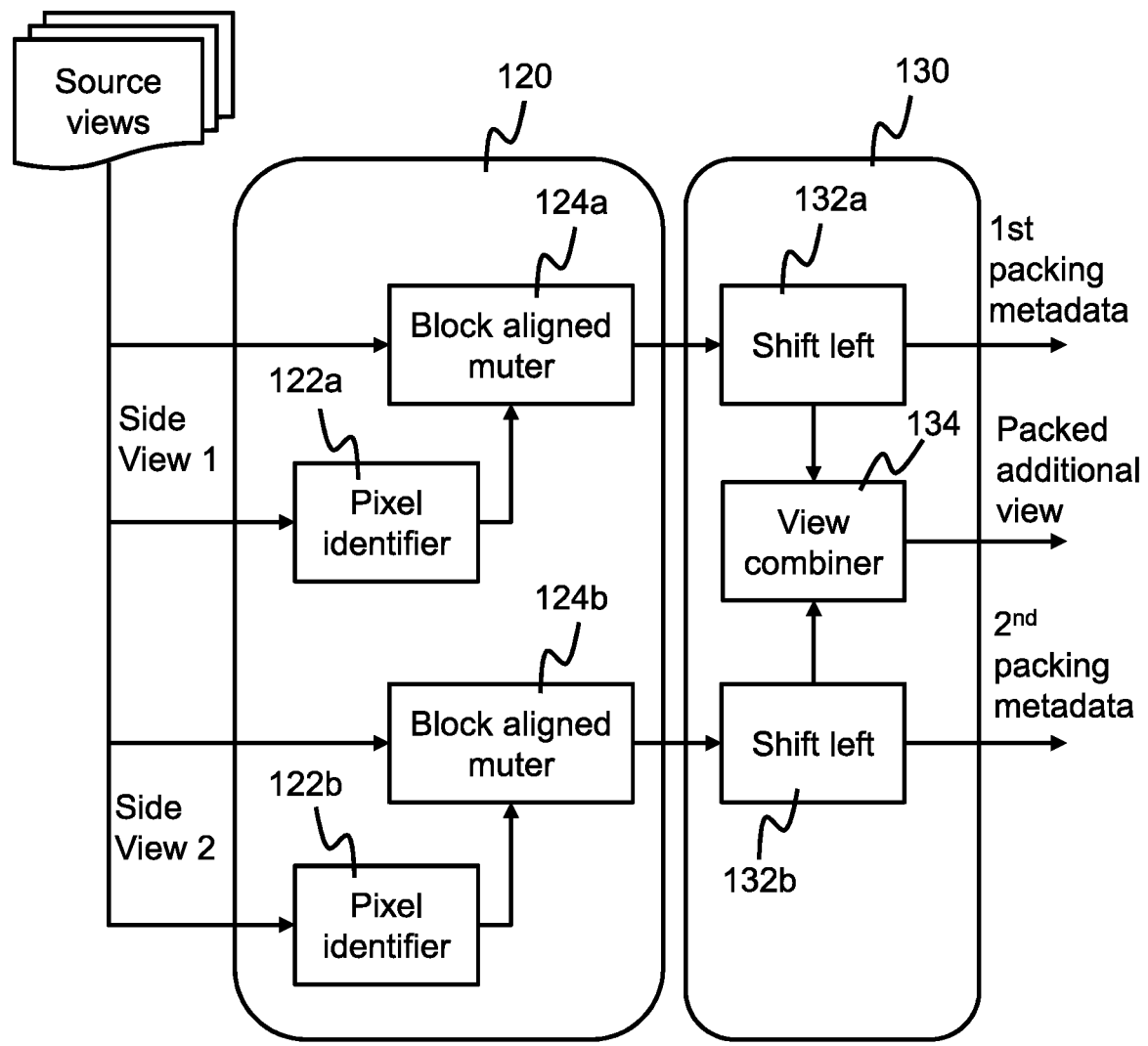
FIG. 3 shows components of the block diagram of FIG. 2 in greater detail.

FIG. 3 shows the pruning unit 120 and the packing unit 130 greater detail. The pruning unit 120 comprises a set of pixel identifier units 122a, b, . . . —one for each side view of the scene. In the example of FIG. 1, there were eight views in total—that is, one basic view and seven side views. FIG. 3 shows just two side views, for ease of explanation. It will be understood that the other side views may be handled similarly. The pruning unit 120 further comprises a set of block aligned muter units 124a, b, . . . —again, one per side view. The packing unit 130 comprises a corresponding set of shift left units 132a, b, etc. It further comprises a view combiner 134, for combining the side views into a packed additional view.

The method performed by the encoder 100 will now be described with reference to FIG. 4. In step 210, the input 110 receives the video data, comprising the basic view and the additional (side) views. For the purposes of the present description, the basic view is assumed to be encoded and compressed separately—this is outside the scope of the present disclosure and will not be discussed further herein. The side views are passed to the pruning unit 120. In particular, the first side view is passed to pixel identifier 122a and block aligned muter 124a. The second side view is passed to pixel identifier 122b and block aligned muter 124b.

In step 220, each pixel identifier 122 identifies pixels in the respective side view that need to be encoded because they contain scene content that is not visible in the basic view. This can be done in one of a number of different ways. In one example, each pixel identifier is configured to examine the magnitude of the gradient of the depth map. Pixels where this gradient is above a predetermined threshold are identified as needing to be encoded. These identified pixels will capture depth discontinuities. Visual information at depth discontinuities needs to be encoded because it will appear differently in different views of the scene—for example, because of parallax effects. In this way, identifying pixels where the magnitude of the gradient is large provides one way of identifying regions of the image that need to be encoded because they will not be visible in the basic view.

In another example, the encoder may be configured to construct a test viewport based on certain pixels being discarded (i.e. not encoded). This may be compared with a reference viewport, constructed while retaining these pixels. The pixel identifier may be configured to calculate a difference (for example, a sum of squared differences between the pixel values) between the test viewport and the reference viewport. If the absence of the selected pixels does not affect the rendering of the test viewport too much (that is, if the difference is not greater than a predetermined threshold), then the tested pixels can be discarded from the encoding process. Otherwise, if discarding them has a significant impact on the rendered test viewport, the pixel identifier 122 should mark them for retention. The encoder may experiment with different sets of pixels proposed for discarding, and choose the configuration that provides the highest quality and/or lowest bitrate or pixel rate.

The output of the pixel identifier 122 is a binary flag for each pixel, indicating whether the pixel is to be retained or discarded. This information is passed to the respective block aligned muter 124. In step 230, the block aligned muter 124a divides the first side view into a plurality of first blocks of pixels. In parallel, the block aligned muter 124b divides the second side view into a plurality of second blocks of pixels. In step 240, the block aligned muter 124a retains those first blocks that contain at least one of the pixels identified by the pixel identifier 122a as needing to be encoded. These blocks are passed to the shift left unit 132a of the packing unit 130. Blocks that do not contain any of the identified pixels are discarded (that is, they are not passed to the packing unit). In the present embodiment, this is implemented by replacing all of the discarded blocks in the side view with black pixels. This replacement with black pixels is referred to herein as "muting". Corresponding steps are carried out by the block aligned muter 124b on the second side view. Retained second blocks of pixels are passed to the shift left unit 132b.

Figure 5A:
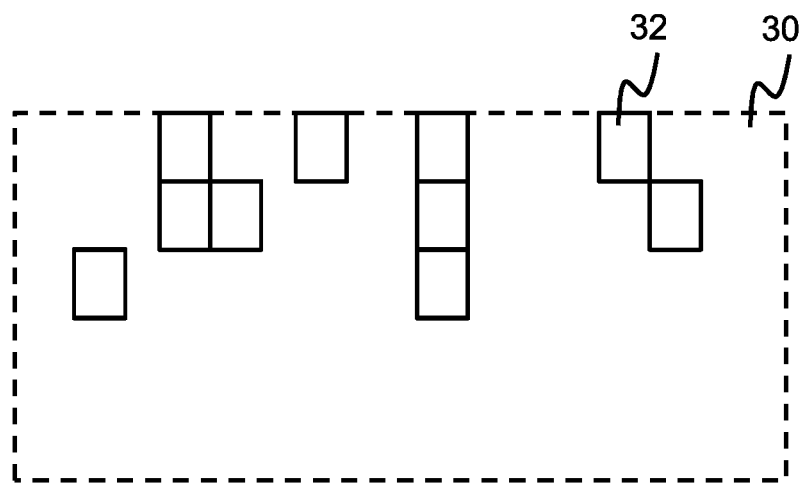
FIGS. 5A-C illustrate the rearrangement of retained blocks of pixels according to an embodiment.
Figure 5B:
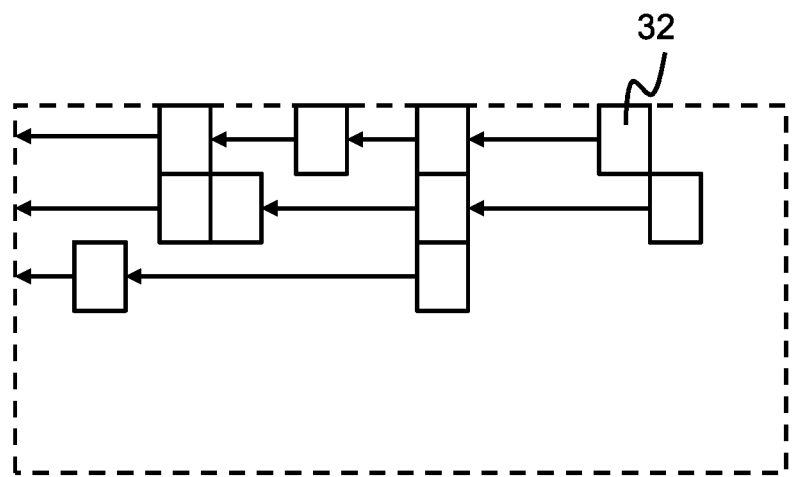
Figure 5C:
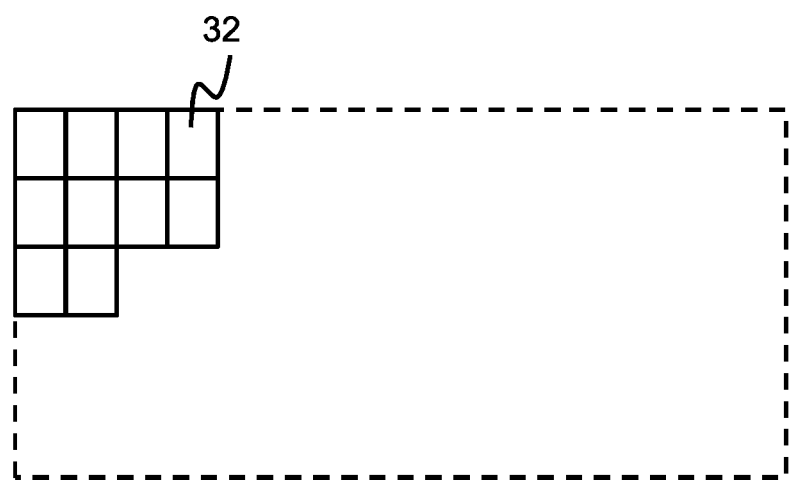

In step 250, the shift left unit 132a rearranges the retained first blocks of pixels so that they are contiguous in at least one dimension. It does this by shifting the blocks to the left until they are all adjacent to one another along respective rows of blocks, with the left-most block in each row adjacent to the left edge of the image. This procedure is illustrated in FIGS. 5A-C. FIG. 5A shows a side view 30, with individual blocks 32 that are to be retained. FIG. 5B illustrates the process of shifting the blocks 32 to the left. FIG. 5C shows the blocks after they have all been shifted to the left hand edge of the image. Each row of blocks is contiguous along the row dimension—that is, there are no gaps between blocks along each row. In this example, the blocks are also contiguous in the column direction; however, this will not necessarily always be the case, when shifting blocks along rows. It is possible that some rows may have no retained blocks in them, in which case there will be a gap between some rows of blocks in the rearranged image. Blocks other than the retained blocks 32 indicated in FIGS. 5A-C are coloured black. Note that FIGS. 5A-C show a small number of blocks in a small region of an exemplary side view. In practice, there will typically be many more blocks. The inventors have found that good results may be obtained with blocks that are rectangular rather than square—that is blocks having a vertical height that is different from their horizontal width. In particular, better result may be achieved with blocks that have a smaller horizontal width than their vertical height. A vertical height of 32 pixels has been found to give good results, with horizontal widths of either 1 pixel or 4 pixels.

In step 260, the view combiner adds the rearranged first retained blocks (from shift left unit 132a) to the packed additional view. After a single side view has been added, the packed additional view is identical to FIG. 5C. In step 270, the shift left unit 132a generates first packing meta data describing how the retained first blocks were rearranged. The shift left unit 132b carries out a similar rearrangement operation on the second retained blocks of the second side view, and generates second packing meta data describing how these blocks were rearranged. The rearranged blocks are passed to the view combiner 134 to be added to the packed additional view. They can be added in a variety of ways. In the present example, each row of retained blocks from the second side view is appended to the corresponding row of retained blocks from the first side view. This procedure can be repeated for each one of the side views, until the packed additional view is complete. Note that, because the side views are relatively sparsely populated with retained blocks, following the muting stage, the retained blocks of all of the side views can be packed into an image with a smaller number of pixels and the total number of pixels of all side views. In particular, in the present example, although the packed additional view has the same number of rows (that is, the same vertical dimension) as each of the original side views, it can have a smaller number of columns (that is, a smaller horizontal dimension). This facilitates a reduction in the pixel rate to be encoded/transmitted.

In step 264, the video encoder 140 receives the packed additional view from the packing unit 130 and encodes the packed additional view and the basic view into a video bitstream. The basic view and the packed additional view may be encoded using a video compression algorithm-which may be a lossy video compression algorithm. In step 274, the metadata encoder 150 encodes the first packing metadata and the second packing metadata into a metadata bitstream. The metadata encoder 150 may also encode into the meta data bitstream a definition of the sequence in which the additional views were added/packed into the packed additional view. This should be done, in particular, if the additional views were not added/packed in a predetermined, fixed order. The metadata is encoded using lossless compression, optionally using an error detecting and/or correcting code. This is because errors in the metadata are likely to have a much more significant impact on the decoding process, if they are not received correctly at the decoder. Suitable error detecting and/or correcting codes are known in the art of communications theory.

Figure 6:
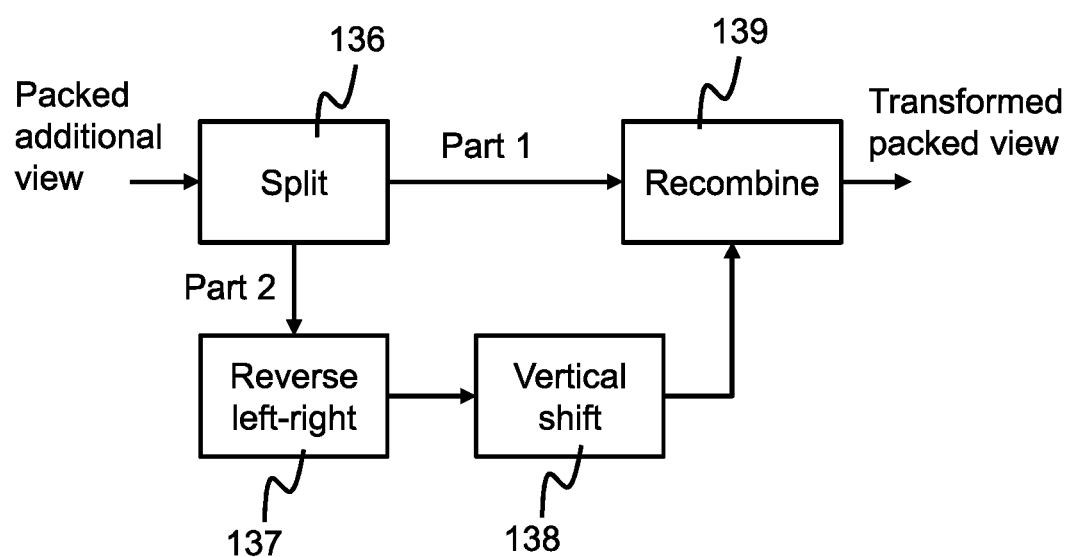
FIG. 6 is a flowchart illustrating further steps for rearrangement of blocks of pixels.

An optional additional encoding stage will now be described, with reference to FIGS. 6 and 7A-D. FIG. 6 is a flowchart showing the process steps, which are illustrated in a graphical example in FIGS. 7A-D. The process of FIG. 6 may be performed by the packing unit 130. It can be performed separately for each side view, or it can be performed on the combination of side views contained in the packed additional view. In FIG. 6, the latter case is assumed.

Figure 7A:
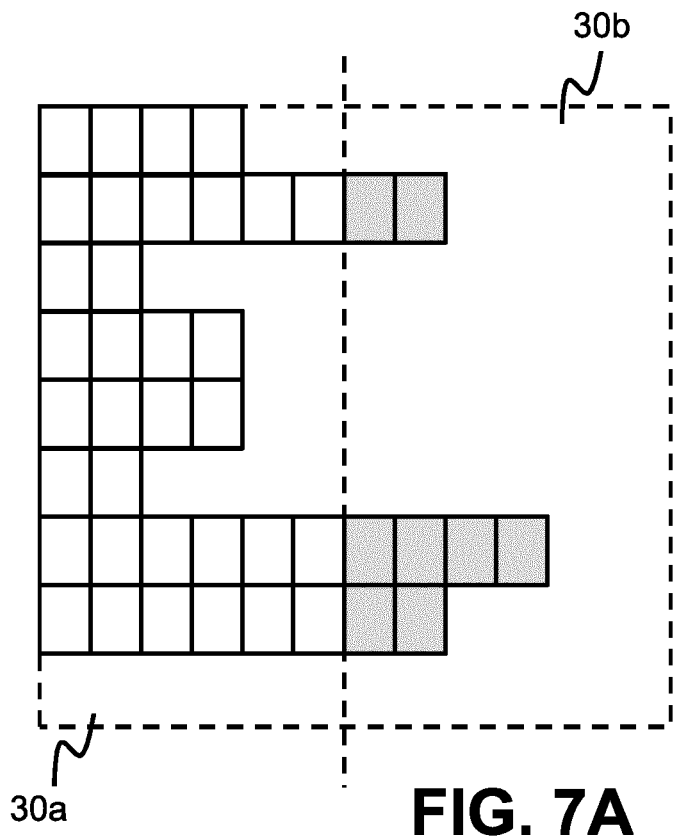
FIGS. 7A-D illustrate a transformation of part of a packed additional view, using the process illustrated in FIG. 6.
Figure 7B:
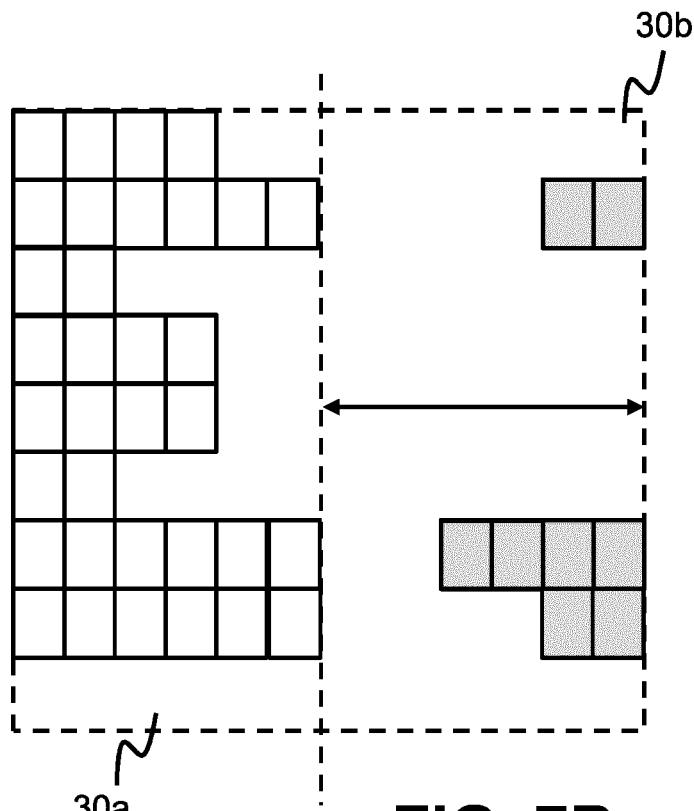
Figure 7C:
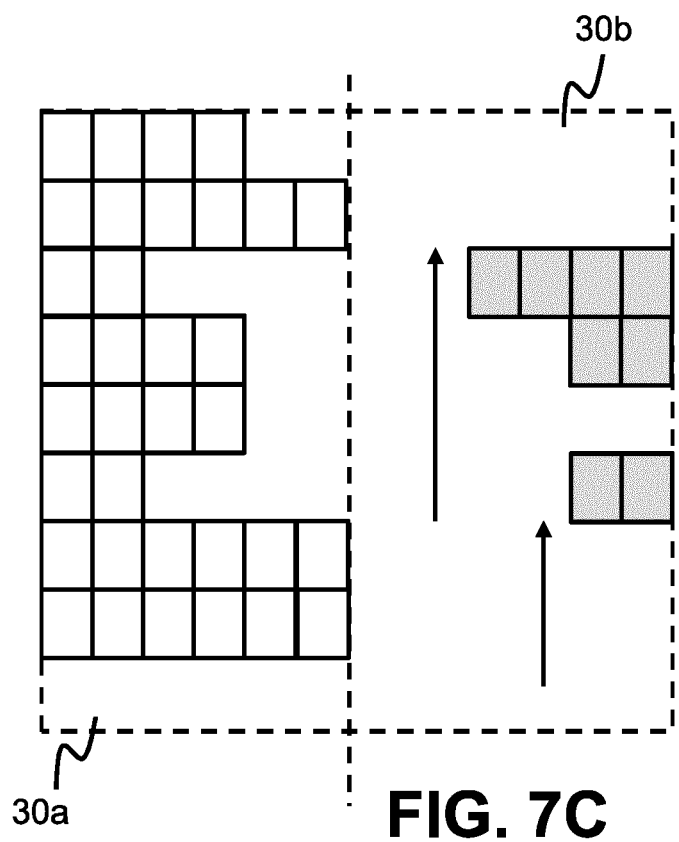
Figure 7D:
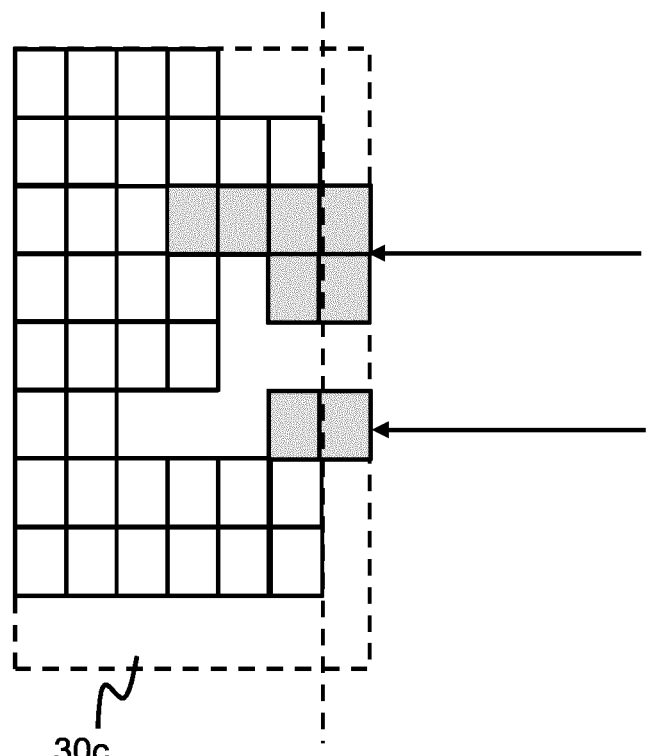

In step 136, the packing unit 130 splits the packed additional view into two parts. In the example illustrated in FIG. 7A, the packed additional view is split into a left part 30a (Part 1) and a right part 30b (Part 2). The blocks of the right part 30b are shaded grey, for clarity of illustration. Next, the right part 30b of the packed additional view is transformed, to make the number of muted (discarded) blocks on each row more uniform. The right part 30b is flipped left-to-right, in step 137. This replaces the the right part 30b with its mirror image, as shown in FIG. 7B. In step 138, the packing unit 130 shifts the retained blocks of the right part 30b vertically, in a circular manner (whereby the top row moves to the bottom row, when shifted vertically "upwards" by one row). In the example shown in FIG. 7C, the blocks are shifted 4 rows upwards. As shown in FIG. 7C, each row of the transformed now includes a similar number of muted (discarded) blocks. Conversely, it can be said that each row contains a similar number of retained blocks. This allows the retained blocks of the transformed right part (shown in grey) to be shifted to the left, to be closer to the retained blocks of the left part. In step 139, the packing unit 130 recombines the transformed right part 30b, with the left part 30a. In the recombination process, the retained blocks of the transformed right part are shifted to the left, to produce a transformed packed view 30c, as shown in FIG. 7D. The left-shift can be performed in a variety of ways. In the example shown in FIG. 7D, every retained block is shifted left by the same number of blocks (i.e. by the same number of columns), such that at least one retained block of the transformed right part is adjacent to at least one block of the left part, along a given row. Alternatively, each row of the transformed right part 30b could be shifted to the left by a row-specific number of blocks, until every row of blocks of the transformed right part 30b is contiguous with a respective row of blocks of the left part 30a. The metadata encoder 150 encodes into the metadata bitstream a description of how the retained blocks of the right part (Part 2) were manipulated when generating the transformed packed view. It will be noted that the size of this description, and therefore the amount of meta data, will depend to some extent on the complexity of the transformation. For example, if all of the rows of the right part are shifted to the left by the same number of columns, then only one value needs to be encoded into the meta data, to describe this part of the transformation. On the other hand, if each row is shifted by a different number of columns, a meta data value will be generated per row.

The complexity of the transformation (and corresponding size of the metadata) can be traded off against the reduction in bit rate and/or pixel rate resulting from the transformation. As will be apparent from the foregoing description, there are several variables when choosing the transformation for the right part (Part 2). These can be chosen in a variety of different ways. For example, the encoder can experiment with different choices of transformation, and can measure the reduction in bit rate and/or pixel rate for each different choice. The encoder can then choose the combination of transformation parameters that results in the largest decrease in bitrate and/or pixel rate.

Figure 8:
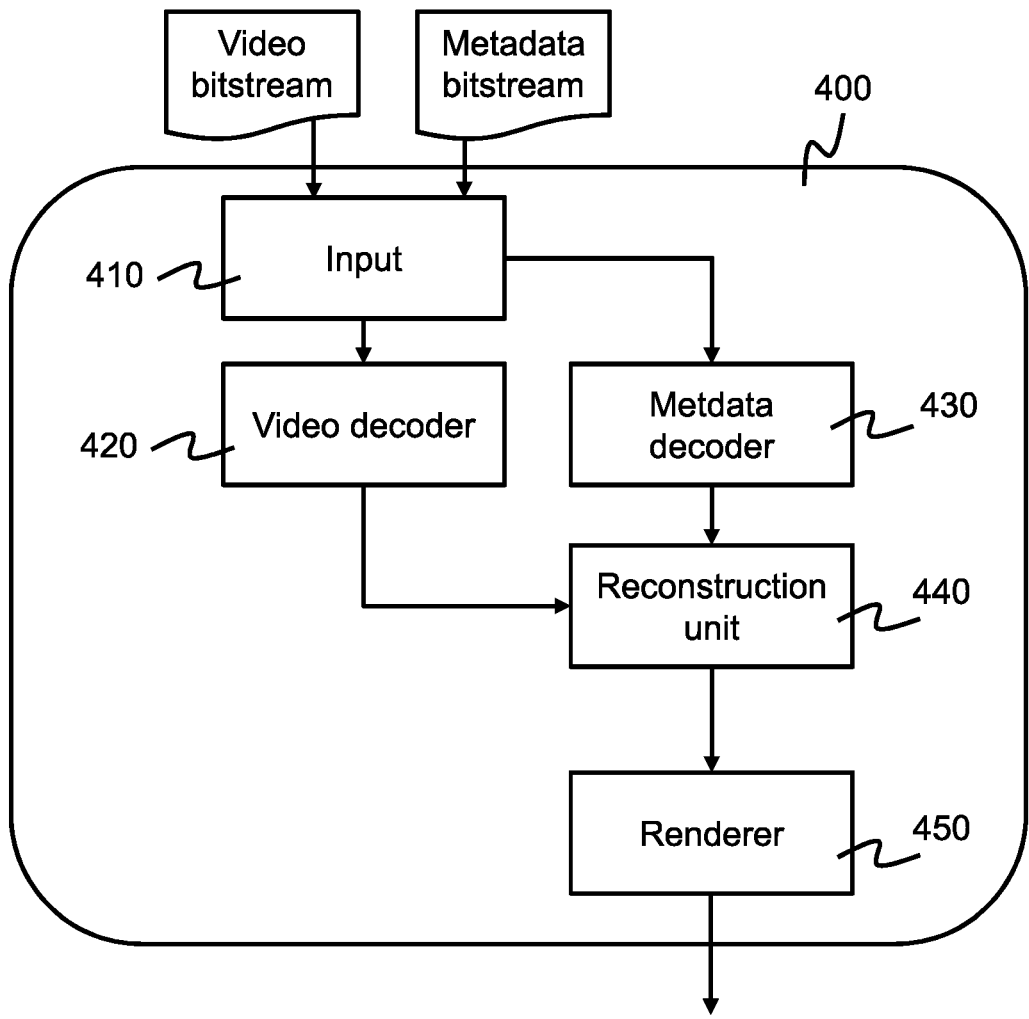
FIG. 8 is a block diagram of a decoder according to an embodiment.
Figure 9:
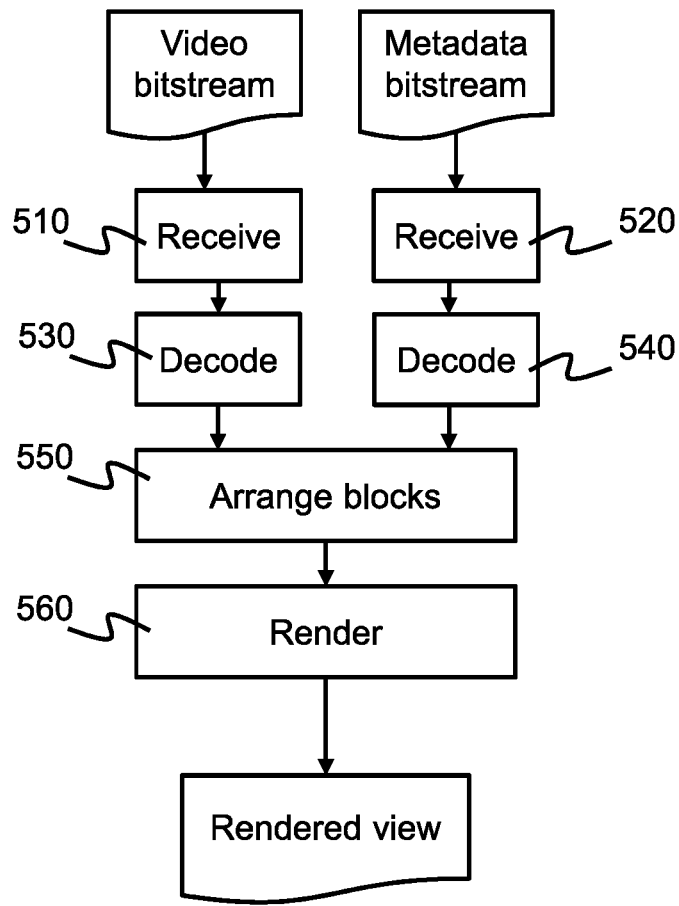
FIG. 9 is a flowchart illustrating a decoding method performed by the decoder of FIG. 8.

FIG. 8 shows a decoder 400 configured to decode the video and meta data bitstreams produced by the encoder of FIG. 2. FIG. 9 shows a corresponding method, performed by the decoder 400.

In step 510, the video bitstream is received at a first input 410. In step 520, the meta data bitstream is received at a second input, which may be the same as or different from the first input. In the present example, the second input is the same as the first input 410. In step 530, a video decoder 420 decodes the video bitstream, to obtain the basic view and the packed additional view. This may comprise decoding according to a standard video compression codec. In step 540, a meta data decoder 430 decodes the meta data bitstream, to obtain first packing meta data, describing how the first additional (side) view was added into the packed additional view, and second packing meta data describing how the second additional (side) view was added into the packed additional view. This includes metadata describing the rearrangement of blocks and optional transformation of parts that were described above with reference to FIGS. 5A-C and 7A-D.

The decoded packed additional view and the decoded metadata are passed to the reconstruction unit 440. In step 550, the reconstruction unit 440 arranges the blocks from the decoded packed additional view into individual side views. It does this by reversing the manipulations performed at the encoder, using the decoded metadata. The decoded basic view and the reconstructed side views are then passed to the renderer 450, which renders a view of the scene based on the inputs, in step 560.

The encoding (and decoding) method described above have been tested against the current state of the art MPEG solution for multi-view 3DoF+ coding (see ISO/IEC JTC 1/SC 29/WG 11 N18464: Working Draft 1 of Metadata for Immersive Media (Video); ISO/IEC JTC 1/SC 29/WG 11 N18470: Test Model for Immersive Video), using MPEG test sequences. The results are shown in Table 1 below. The results show that the method of the present embodiment achieves a pixel rate that is between 34% and 61% of the current state of the art algorithm, and a bitrate that is between 27% and 82% of the state of the art, depending on the test sequence and block size. In the right-hand column, 4×32 means a block size 4 pixels wide, horizontally, and 32 pixels high, vertically; 1×32 means a block 1 pixel wide, horizontally, and 32 pixels high, vertically.

TABLE 1 experimental results on MPEG test sequences relative to MPEG working draft for immersive video

| | Bitrate | Pixel rate | blkh × blkv |
|---|---|---|---|
| sa | 82% | 61% | 4 × 32 |
| sb | 62% | 41% | 4 × 32 |
| sc | 40% | 34% | 4 × 32 |
| sd | 80% | 52% | 4 × 32 |
| sa | 69% | 43% | 1 × 32 |
| sb | 41% | 37% | 1 × 32 |
| sc | 27% | 34% | 1 × 32 |
| sd | 64% | 52% | 1 × 32 |

Those skilled in the art will appreciate that the embodiment described above is just one example within the scope of the present disclosure. Many variations are possible. For example, the rearrangement of retained blocks is not limited to left shifts. Blocks may be shifted to the right instead of left. They may be shifted vertically along columns instead of horizontally along rows. In some embodiments, the vertical shifts and horizontal shifts may be combined, to achieve better packing of retained blocks. Without wishing to be bound by theory, it is believed that coding efficiency may be improved (and thus bit rate reduced) if the blocks are rearranged such that similar visual content is contained in retained blocks that are adjacent to one another in the packed representation. This can allow standard video compression algorithms to achieve the best coding efficiency, since they are typically designed to exploit spatial redundancy in the image content like this. Consequently, different rearrangements and transformations of blocks may work better for different types of scene. In some embodiments, the encoder may test a variety of different rearrangements and transformations, and may pick the combination of rearrangements and/or transformations that results in the greatest reduction in bit rate and/or pixel rate for that scene, while maintaining the highest quality (i.e. accuracy of reproduction).

Figure 4:
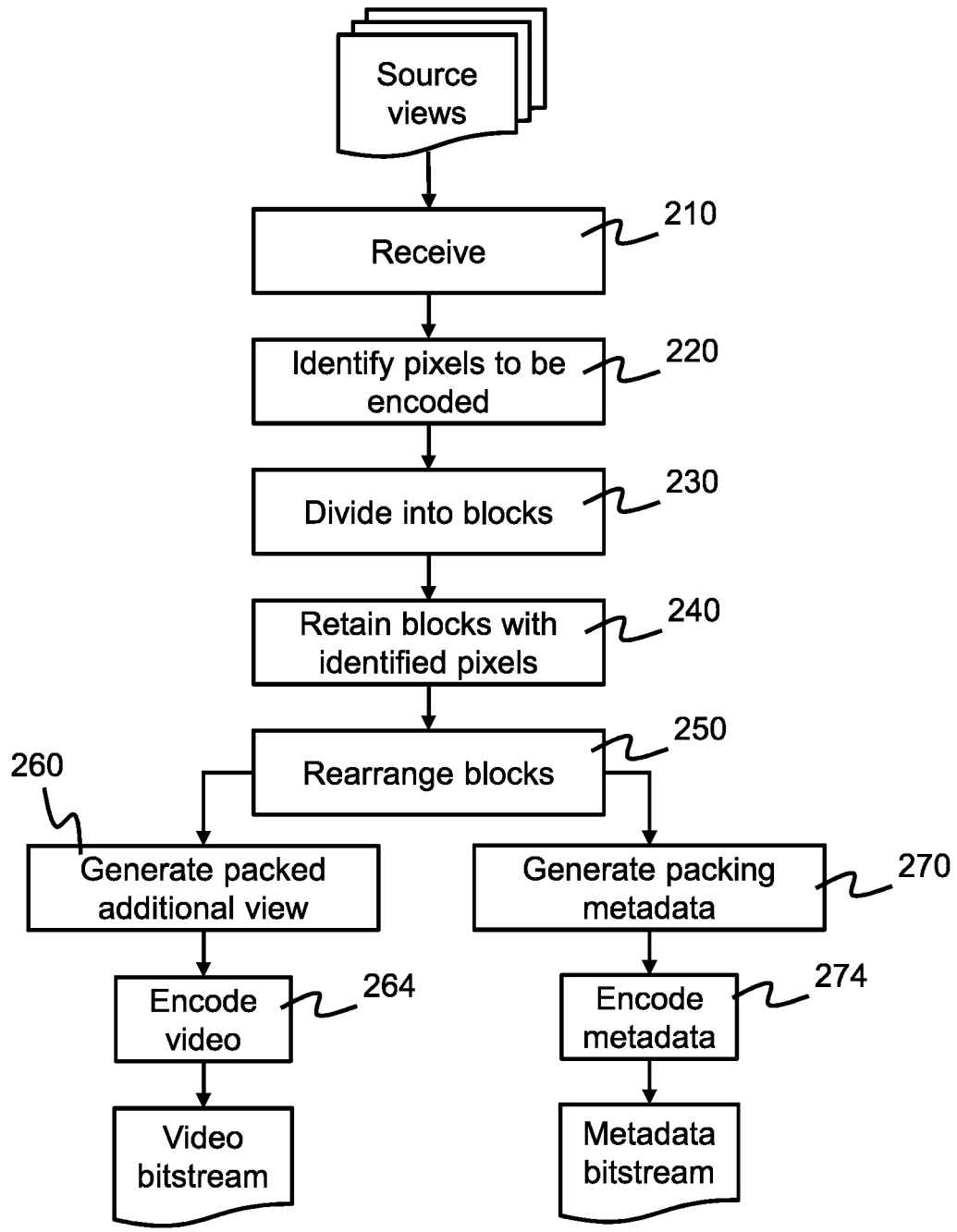
FIG. 4 is a flowchart illustrating an encoding method performed by the encoder of FIG. 1.

The encoding and decoding methods of FIGS. 4 and 9, and the encoder and decoder of FIGS. 2 and 8, may be implemented in hardware or software, or a mixture of both (for example, as firmware running on a hardware device). To the extent that an embodiment is implemented partly or wholly in software, the functional steps illustrated in the process flowcharts may be performed by suitably programmed physical computing devices, such as one or more central processing units (CPUs) or graphics processing units (GPUs). Each process—and its individual component steps as illustrated in the flowcharts—may be performed by the same or different computing devices. According to embodiments, a computer-readable storage medium stores a computer program comprising computer program code configured to cause one or more physical computing devices to carry out an encoding or decoding method as described above when the program is run on the one or more physical computing devices.

Storage media may include volatile and non-volatile computer memory such as RAM, PROM, EPROM, and EEPROM. Various storage media may be fixed within a computing device or may be transportable, such that the one or more programs stored thereon can be loaded into a processor.

Metadata according to an embodiment may be stored on a storage medium. A bitstream according to an embodiment may be stored on the same storage medium or a different storage medium. The metadata may be embedded in the bitstream but this is not essential. Likewise, metadata and/or bitstreams (with the metadata in the bitstream or separate from it) may be transmitted as a signal modulated onto an electromagnetic carrier wave. The signal may be defined according to a standard for digital communications. The carrier wave may be an optical carrier, a radio-frequency wave, a millimeter wave, or a near field communications wave. It may be wired or wireless.

To the extent that an embodiment is implemented partly or wholly in hardware, the blocks shown in the block diagrams of FIGS. 2 and 8 may be separate physical components, or logical subdivisions of single physical components, or may be all implemented in an integrated manner in one physical component. The functions of one block shown in the drawings may be divided between multiple components in an implementation, or the functions of multiple blocks shown in the drawings may be combined in single components in an implementation. Hardware components suitable for use in embodiments of the present invention include, but are not limited to, conventional microprocessors, application specific integrated circuits (ASICs), and field-programmable gate arrays (FPGAs). One or more blocks may be implemented as a combination of dedicated hardware to perform some functions and one or more programmed microprocessors and associated circuitry to perform other functions.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A method comprising:
   receiving a multi-view image or video data,
      wherein the multi-view image or video data comprises a basic view and at least a first additional view,
      wherein each view is a view of a scene,
      wherein basic view comprises an basic pixels,
      wherein the first additional view comprises first additional pixels;
   identifying first pixels in the first additional view, wherein the identification of first pixels is based on scene-content that is not visible in the basic view;
   dividing the first additional view into a plurality of first blocks, wherein each of the plurality of first blocks comprise a portion of the first additional pixels;
   retaining a first portion of the plurality of first blocks, wherein the first portion of the plurality of first blocks comprises at least one of the first pixels;
   rearranging the first portion of the plurality of first blocks such that the first portion of the plurality of first blocks are contiguous in at least one dimension;
   generating a packed additional view from the rearranged first portion of the plurality of first blocks;
   generating a first packing metadata describing how the first portion of the plurality of first blocks are rearranged;
   encoding the basic view and the packed additional view into a video bitstream; and
   encoding the first packing metadata into a metadata bitstream.

2. The method of claim 1,
   wherein rearranging the first portion of the plurality of first blocks comprises shifting each block of the first portion of the plurality of first blocks in one dimension,
   wherein the shifting is arranged to position each block of the first portion of the plurality of first blocks directly adjacent to its nearest block of the first portion of the plurality of first blocks along that dimension.

3. The method of claim 1,
   wherein the each of the plurality of first blocks are rectangular blocks,
   wherein each of the plurality of first blocks have a width in pixels and a height in pixels,
   wherein the width in pixels is different from the height in pixels.

4. The method of claim 1 further comprising:
   identifying second pixels in a second additional view,
      wherein the multi-view image or video data comprises the second additional view,
      wherein the second additional view comprises second additional pixels,
      wherein the identification of second pixels is based on scene-content that is not visible in the basic view;
   dividing the second additional view into a plurality of second blocks, wherein each of the plurality of second blocks comprise a portion of the second additional pixels;
   retaining a second portion of the plurality of second blocks, wherein the second portion of the plurality of second blocks comprises at least one of the second pixels;
   rearranging the second portion of the plurality of second blocks such that the second portion of the plurality of second blocks are contiguous in the at least one dimension;
   generating a second packing metadata describing how the second portion of the plurality of second blocks are rearranged;
   adding the rearranged second blocks to the packed additional view; and
   encoding the second packing metadata into the metadata bitstream.

5. The method of claim 4, further comprising encoding into the meta data bitstream a description,
   wherein the description describes an order,
   wherein the order is the manner in which the additional views were added into the packed additional view.

6. The method of claim 1, further comprising:
splitting the packed additional view into a first part and a second part;
transforming the second part relative to the first part so as to generate a transformed packed view; and
encoding the transformed packed view into the video bitstream.

7. The method of claim 6, wherein the transforming comprises one or more of:
reversing the second part in a horizontal direction;
inverting the second part in a vertical direction;
transposing;
circularly shifting the second part along the horizontal direction and
circularly shifting the second part along the vertical direction.

8. The method of claim 6, wherein
the retained blocks in a least one of the first part and the second part are rearranged by shifting them to the left.

9. The method of claim 1,
wherein the packed additional view has the same size as at least the first additional view,
wherein the packed additional view has at least one dimension.

10. A method of decoding comprising:
receiving a video bitstream,
  wherein the video bitstream comprises a basic view and a packed additional view of a scene,
  wherein each view comprises an array of pixels;
receiving a meta data bitstream,
  wherein the metadata bitstream comprises first packing metadata,
  wherein the first packing metadata comprises a description of how first blocks of a first additional view were rearranged into the packed additional view;
decoding the video bitstream so as to obtain the basic view and the packed additional view;
decoding the first packing metadata from the meta data bitstream;
reconstructing the first additional view from the packed additional view, using the first packing metadata, so as to generate a reconstructed first additional view; and
rendering at least one view of the scene based on the basic view and the reconstructed first additional view,
wherein reconstructing the first additional view comprises arranging the first blocks according to the description in the first packing metadata.

11. The method of claim 10 further comprising:
decoding the second packing meta data,
  wherein the metadata bitstream comprises second packing metadata,
  wherein the second packing metadata comprises a description of how second blocks are rearranged into the packed additional view;
reconstructing a second additional view using the second packing metadata so as to generate a reconstructed second additional view, wherein the packed additional view comprises the second additional view; and
rendering at least one view of the scene based on the basic view and the reconstructed second additional view,
wherein reconstructing the second additional view comprises arranging second blocks according to a description in the second packing metadata
wherein the packed additional view comprises second blocks,
wherein the second blocks belong to the second additional view.

12. A computer program stored on a non-transitory medium, wherein the computer program when executed on a processor performs the method as claimed in claim 1.

13. An encoder comprising:
an input circuit,
  wherein the input circuit is arranged to receive a multi-view image or video data,
  wherein the multi-view image or video data comprises a basic view and at least a first additional view of a scene,
  wherein each view is a view of a scene;
a pruning circuit
wherein the pruning circuit is arranged to identify pixels in the first additional view that need to be encoded,
wherein the pixels that need to be encoded comprise scene-content that is not visible in the basic view,
wherein the pruning circuit is arranged to divide the first additional view into a plurality of first blocks;
wherein the pruning circuit is arranged to retain first blocks comprising at least one of the identified pixels; and
a packing circuit,
  wherein the packing circuit is arranged to rearrange the first portion of the first blocks of pixels contiguously in at least one dimension,
  wherein the packing circuit is arranged to generate a packed additional view from the rearranged first retained blocks,
  wherein the packing circuit is arranged to generate first packing metadata,
  wherein the first packing metadata describes how the first portion of the first blocks are rearranged;
a video encoder circuit, wherein the video encoder circuit is arranged to encode the basic view and the packed additional view into a video bitstream; and
a metadata encoder circuit, wherein the metadata encoder circuit is arranged to encode the first packing metadata into a metadata bitstream.

14. The encoder of claim 13,
wherein rearranging the first portion of the plurality of first blocks comprises shifting each block of the first portion of the plurality of first blocks in one dimension,
wherein the shifting is arranged to position each block of the first portion of the plurality of first blocks directly adjacent to its nearest block of the first portion of the plurality of first blocks along that dimension.

15. The encoder of claim 13,
wherein the each of the plurality of first blocks are rectangular blocks,
wherein each of the plurality of first blocks have a width in pixels and a height in pixels,
wherein the width in pixels is different from the height in pixels.

16. The encoder of claim 13,
wherein the pruning circuit is arranged to identify second pixels in a second additional view,
  wherein the multi-view image or video data comprises the second additional view,
  wherein the second additional view comprises second additional pixels,
  wherein the identification of second pixels is based on scene-content that is not visible in the basic view;
wherein the pruning circuit is arranged to dividing the second additional view into a plurality of second blocks, wherein each of the plurality of second blocks comprise a portion of the second additional pixels;

wherein the pruning circuit is arranged to retain a second portion of the plurality of second blocks, wherein the second portion of the plurality of second blocks comprises at least one of the second pixels;

wherein the packing circuit is arranged to rearrange the second portion of the plurality of second blocks such that the second portion of the plurality of second blocks are contiguous in the at least one dimension;

wherein the packing circuit is arranged to generate a second packing metadata describing how the second portion of the plurality of second blocks are rearranged;

wherein the packing circuit is arranged to add the rearranged second blocks to the packed additional view; and wherein the metadata encoder is arranged encode the second packing metadata into the metadata bitstream.

17. A decoder comprising:

a first input circuit,
    wherein the first input circuit is arranged to receive a video bitstream,
    wherein the first input circuit comprises a basic view and a packed additional view,
    wherein each view comprising an array of pixels;

a second input circuit,
    wherein the second input circuit is arranged to receive a meta data bitstream,
    wherein the metadata bitstream comprises first packing metadata,
    wherein the first packing metadata comprises a description of how first blocks of a first additional view are rearranged into the packed additional view;

a video decoder circuit, wherein the video decoder circuit is arranged to decode the video bitstream so as to obtain the basic view and the packed additional view;

a metadata decoder circuit, wherein the metadata decoder circuit is arranged to decode the first packing metadata from the metadata bitstream;

a reconstruction circuit, wherein the reconstruction circuit is arranged to reconstruct the first additional view from the packed additional view, using the first packing metadata, so as to generate a reconstructed first additional view; and a renderer circuit, wherein the renderer circuit is arranged to render at least one view of the scene based on the basic view and the reconstructed first additional view, wherein the reconstruction circuit is configured to arrange the first blocks according to the description in the first packing metadata.

18. The decoder of claim 17, wherein the video decoder circuit is arranged to decode the second packing metadata,
    wherein the metadata bitstream comprises second packing metadata,
    wherein the second packing metadata comprises a description of how second blocks are rearranged into the packed additional view;

wherein the reconstruction circuit is arranged reconstruct a second additional view using the second packing metadata so as to generate a reconstructed second additional view, wherein the packed additional view comprises the second additional view; and wherein the renderer circuit is arranged render at least one view of the scene based on the basic view and the reconstructed second additional view, wherein reconstructing the second additional view comprises arranging second blocks according to a description in the second packing metadata wherein the packed additional view comprises second blocks, wherein the second blocks belong to the second additional view.

* * * * *